United States Patent [19]

Spector

[11] Patent Number: 4,885,917
[45] Date of Patent: Dec. 12, 1989

[54] HOUSEHOLD APPLIANCE FOR MAKING FROZEN FOOD PRODUCTS

[76] Inventor: Donald Spector, 380 Mountain Rd., Union City, N.J. 07087

[21] Appl. No.: 920,669
[22] Filed: Oct. 20, 1986
[51] Int. Cl.⁴ ............................................. A23G 9/12
[52] U.S. Cl. ...................................... 62/343; 366/205
[58] Field of Search .................. 62/342, 343; 366/314, 366/205

[56] References Cited

U.S. PATENT DOCUMENTS

| | | | |
|---|---|---|---|
| 2,557,813 | 6/1951 | Burton | 62/342 X |
| 2,577,916 | 12/1951 | Rollman | 62/342 X |
| 2,762,613 | 9/1956 | Burton | 62/342 X |
| 2,992,715 | 7/1961 | Blackly | 366/205 X |
| 3,005,399 | 10/1961 | Libson | 366/314 X |
| 3,612,126 | 10/1971 | Emmons et al. | 366/205 X |
| 3,780,536 | 12/1973 | Fishman et al. | 62/342 |
| 3,881,705 | 5/1975 | Greenspar | 366/205 X |
| 3,952,538 | 4/1976 | Warbick | 62/343 |
| 4,326,389 | 4/1982 | Frost | 62/342 |
| 4,551,026 | 11/1985 | Cristante | 366/205 X |
| 4,583,863 | 4/1986 | Pendolfi | 62/342 X |

Primary Examiner—William E. Tapolcai
Attorney, Agent, or Firm—Michael Ebert

[57] ABSTRACT

An appliance for making ice cream as well as other frozen or chilled food and beverage products, motive power for the appliance being supplied thereto by the existing electric power base unit of a standard household blender. This standard unit includes a motor whose shaft extends upwardly through a platform having a cage or socket thereon to accommodate a blender bowl, the shaft terminating in a drive coupler. The appliance is constituted by a bowl assembly whose bottom section is embraced by a ring adapted to be received in the socket of the power base unit. Above the bottom section is a double-walled jacket whose cavity contains a freezable agent. Supported for rotation in the bottom wall of the assembly and extending therethrough is a short axle whose lower end terminates in a driven coupler that is engaged by the drive coupler of the power base unit when the ring of the assembly is nested in the cage, the upper end of the axle being coupled to a dasher rotatable within the assembly. In practice, the bowl assembly is first stored in an available freezer for a period sufficient to freeze the agent therein. It is then taken out of the freezer, filled with ingredients to be frozen or chilled and placed on the power base unit. When the motor is turned on, this causes the rotating dasher to mix the ingredients while they are concurrently being chilled by heat transfer from the jacket.

5 Claims, 2 Drawing Sheets

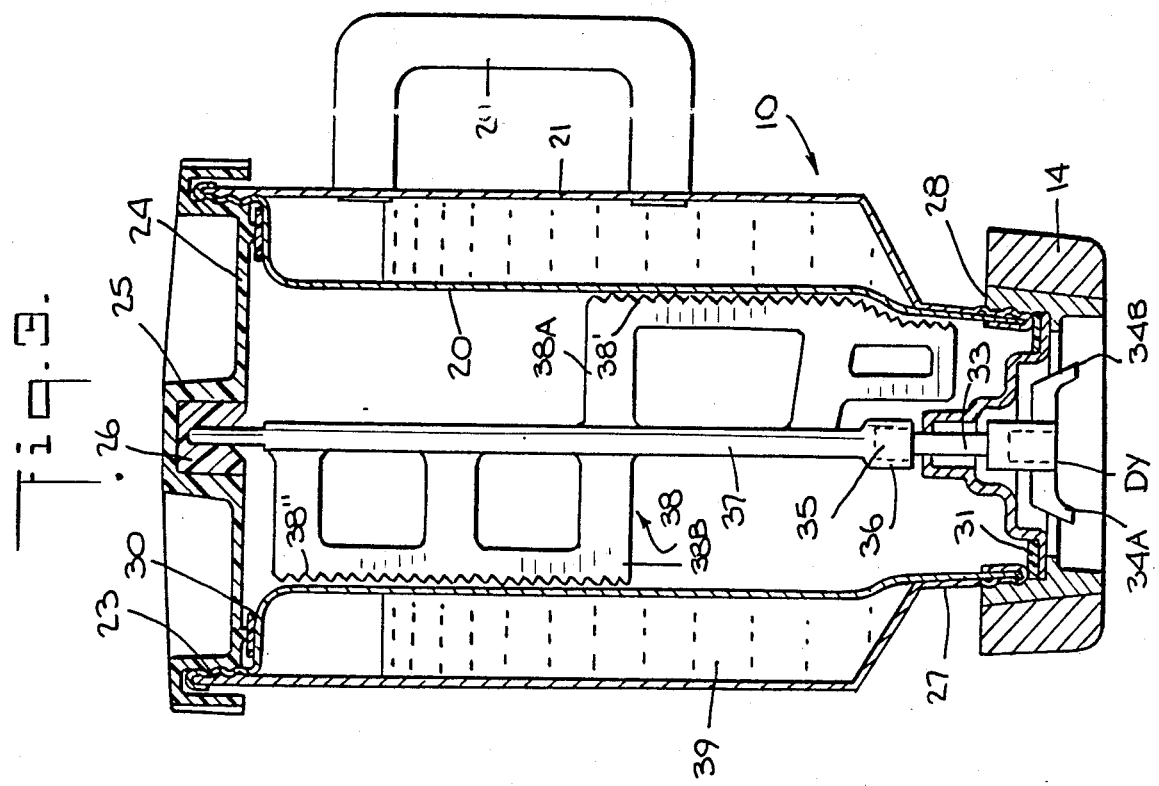
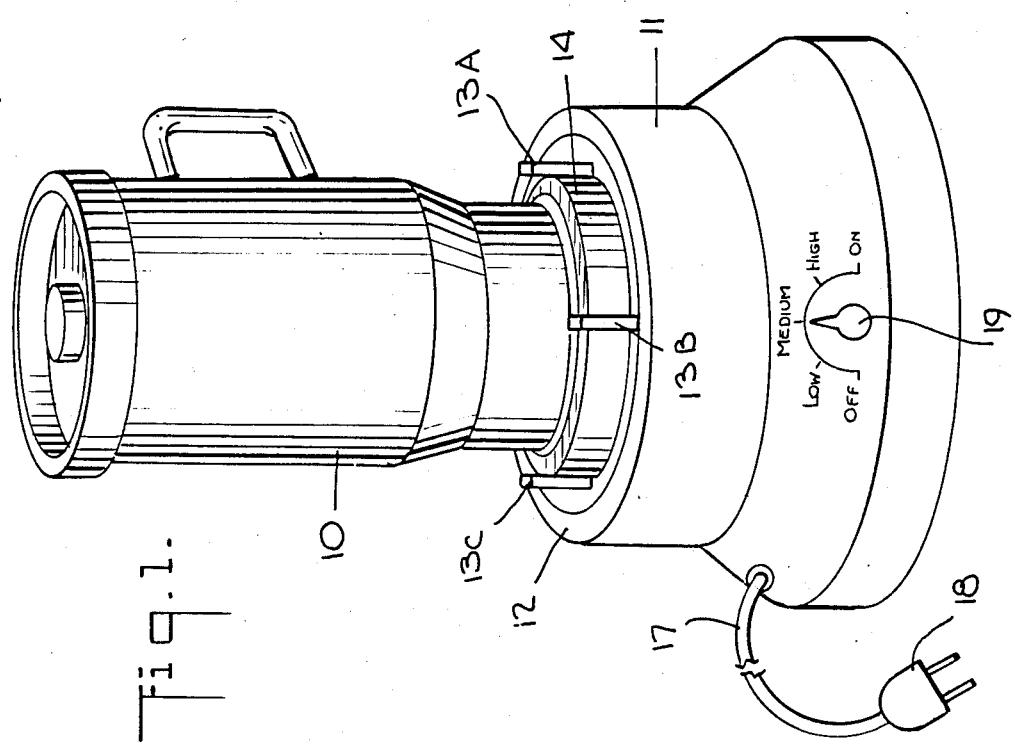

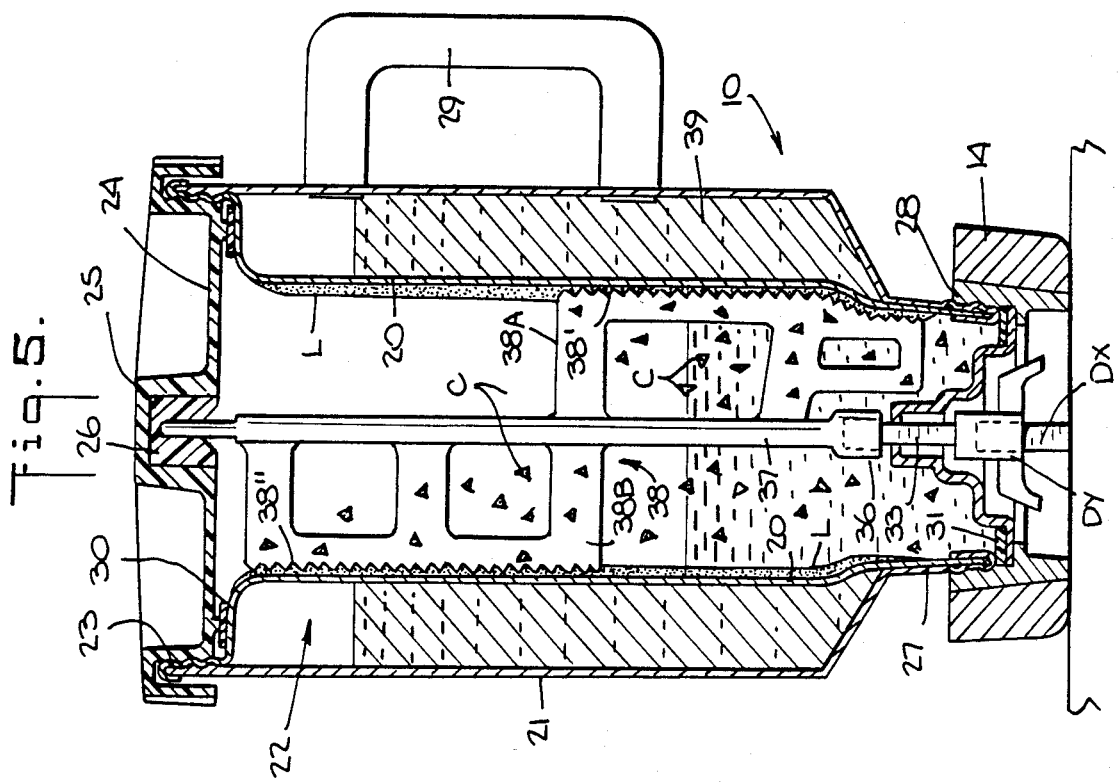
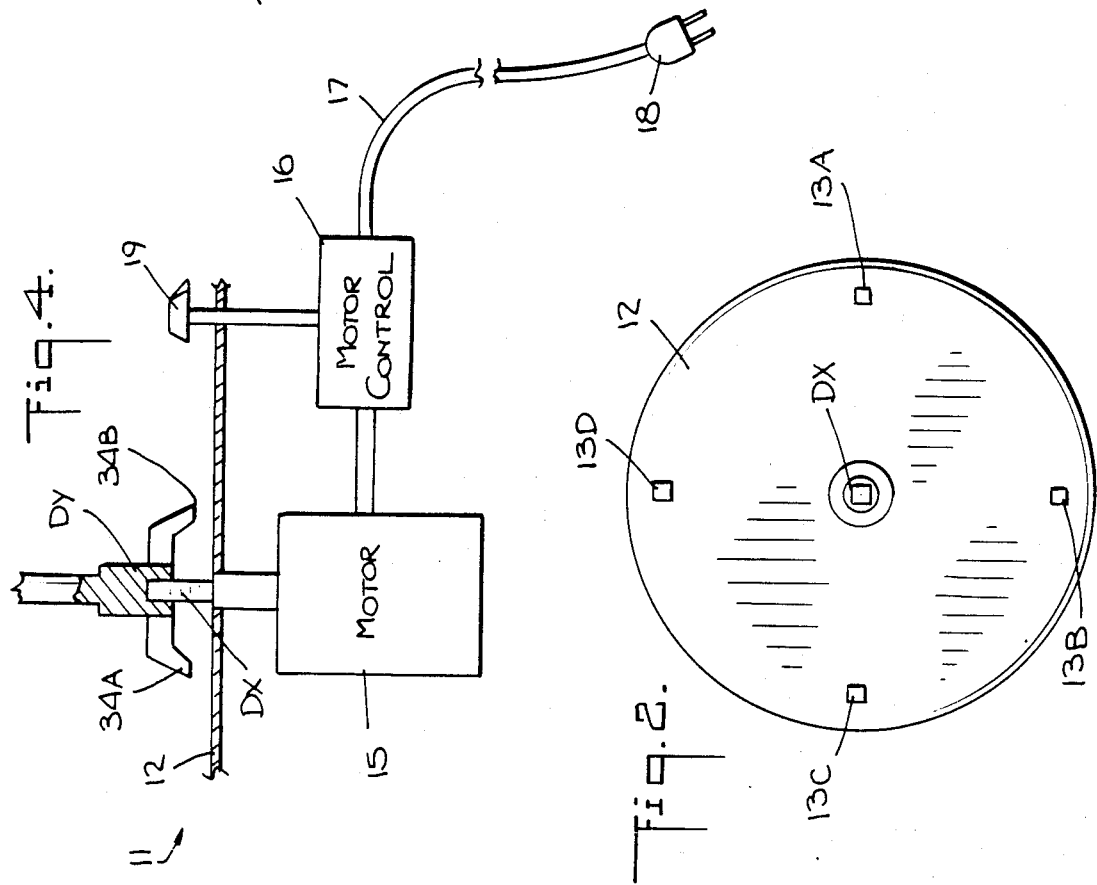

HOUSEHOLD APPLIANCE FOR MAKING FROZEN FOOD PRODUCTS

BACKGROUND OF INVENTION

1. Field of Invention:

This invention relates generally to electric household appliances for making ice cream, frozen yogurt and other frozen or chilled foods and confections, and more particularly to an appliance of this type whose motive power is supplied by the existing power base unit of a standard household blender.

2. Status of Prior Art:

Ice cream, frozen yogurt and other frozen food and confection products are available in packaged form in supermarkets and in other retail outlets. Yet in many households, a strong preference exists for such frozen products in homemade form. The reason behind this preference, say, in the case of ice cream, is that one can make ice cream with fresh cream, genuine fruit flavors and other natural ingredients of high quality that are free of chemical preservatives and other synthetic additives normally found in commercial products. The modern trend in our nutritionally conscious society is to avoid, if possible, all additives in otherwise natural food products.

Moreover, the cost of a homemade ice cream of high quality is usually well below that of a comparable commercially-produced product. Similarly, in the case of frozen yogurt, one can start with a home cultured yogurt of better quality than is available commercially in packaged form, for this yogurt is devoid of all objectionable additives.

Household ice cream makers are known which make use of a container or vessel in which the ingredients required to produce an ice cream of a desired flavor are stirred and homogenized. The vessel is surrounded by a freezing compartment which by heat transfer serves to chill the resultant mixture while it is being continually stirred. This freezing compartment may be of a type adapted to contain ice cubes or other forms of refrigeration.

Thus, the Cristante patent 4,551,026 discloses a household appliance for making ice cream in which the vessel containing the ice cream mix has a rotating stirrer therein and is surrounded by the coil of a mechanical refrigerator unit of the compressor type.

In the Knight, Jr., patent 3,914,956, a soft ice cream dispenser is disclosed which includes a bucket having a motoroperated rotatable dasher therein for mixing the ingredients. Received within the bucket is a double-walled freeze cylinder whose internal cavity is filled with a eutectic freezing solution. This freeze cylinder is removed from the bucket and placed in the freezer compartment of a refrigerator and held therein until the freezing solution is frozen. The cylinder is then returned to the bucket where it serves to chill the mixture being stirred therein.

An arrangement similar to Knight, Jr., is shown in the Vasaka et al. patent 4,488,817 in which the ice cream maker includes a double-walled cylindrical vessel whose internal cavity is filled with a cold keeping agent that is frozen before use so that when cream is thereafter placed in the vessel, the cream is caused to freeze as it is being stirred by a manually-operated dasher.

The use of a manually-operated dasher in a household ice cream maker is a throwback to the farm days when ice cream was made by turning a crank handle. This type of operation is time consuming and difficult to carry out, and is therefore unacceptable to the modern householder. When, however, the ice cream appliance is motor driven, as in the Cristante patent, the appliance which incorporates this motor is then relatively expensive and bulky.

SUMMARY OF INVENTION

In view of the foregoing, the main object of this invention is to provide a household appliance for making ice cream and other frozen food products in which motive power therefor is supplied by the existing power base unit of a standard household blender.

Most households are equipped with an electric blender for grinding or mixing ingredients to produce a uniform mixture or a fine suspension. Thus, commercially now available on the American market are so-called WARING blenders and similar blenders made by OSTER, HAMILTON BEACH and other makers.

The typical blender of this type is constituted by a power base unit having a motor therein whose shaft extends upwardly through a top platform and terminates in a drive coupler that is disposed within a cage on the platform. Placeable on the platform is a glass bowl having a propeller type cutter therein. This cutter is supported for rotation adjacent the base of the bowl by a short axle which extends through the base and terminates in an external driven coupler. This driven coupler is engaged by the drive coupler when the bottom of the bowl is nested within the cage of the power base unit.

In operation, the cutter is caused to turn at high speed, and it acts not only to comminute carrots or whatever other solid food product is included in the mixture contained in the bowl, but it also acts to stir and homogenize the mixture. It is therefore a simple matter for the user to fill the bowl with the ingredients that are to be comminuted and mixed, and then switch on the motor. When the operation is complete and the motor is switched off, the mixture from the bowl is poured into glasses, after which the bowl is cleaned before being returned to the power unit. Such commercial blenders are found in most households.

The most significant feature of the present invention is that it provides a bowl assembly capable of being used in place of the bowl normally a part of a standard electric blender. This bowl assembly is adapted not only to mix the ingredients placed therein to make a frozen food product, but it also acts to chill this mixture as it is being stirred.

Thus, a salient advantage of the present invention is that it exploits the existing power base unit of a household blender, so that this power base unit now has a dual function, and the householder no longer requires a power base unit for his blender and a separate power base unit for his ice cream maker.

More particularly, an object of this invention is to provide a bowl assembly for making ice cream, frozen yogurt and other frozen food and chilled liquid products, which assembly incorporates therein a double-walled cylindrical jacket, the internal cavity of which is filled with a gel or other freezable agent having a large heat capacity. When frozen, this agent acts to chill the ingredients contained in the bowl as these ingredients are being continually mixed.

Briefly stated, these objects are attained in an appliance for making ice cream as well as other frozen or chilled food and beverage products, motive power for the appliance being supplied thereto by the existing electric power base unit of a standard household blender. This standard unit includes a motor whose shaft extends upwardly through a platform having a cage or socket thereon to accommodate a blender bowl, the shaft terminating in a drive coupler. The appliance is constituted by a bowl assembly whose bottom section is embraced by a ring adapted to be received in the socket of the power base unit. Above the bottom section is a double-walled jacket whose cavity contains a freezable agent. Supported for rotation in the bottom wall of the assembly and extending therethrough is a short axle whose lower end terminates in a driven coupler that is engaged by the drive coupler of the power base unit when the ring of the assembly is nested in the cage, the upper end of the axle being coupled to a dasher rotatable within the assembly. In practice, the bowl assembly is first stored in an available freezer for a period sufficient to freeze the agent therein. It is then taken out of the freezer, filled with ingredients to be frozen of chilled and placed on the power base unit. When the motor is turned on, this causes the rotating dasher to mix the ingredients while they are concurrently being chilled by heat transfer from the jacket.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a household appliance for making cold food products, the appliance being constituted by a bowl assembly in accordance with the invention adapted to cooperate with the power base unit of a standard blender;

FIG. 2 is a plan view of the power base unit showing the top platform thereof;

FIG. 3 is a longitudinal section taken through the bowl assembly;

FIG. 4 is a detail showing how the drive coupler of the unit engages the driven coupler of the assembly; and FIG. 5 schematically illustrates the action of the dasher of the bowl assembly.

DESCRIPTION OF INVENTION Structure of Appliance:

Referring now to FIGS. 1 and 2, there is shown a household appliance for making frozen food products such as milk shakes, ice cream and frozen yogurt. This appliance is constituted by a bowl assembly 10 in accordance with the invention which cooperates with the power base unit 11 of a standard household blender.

The case of unit 11 is provided with a top platform 12 having mounted thereon at equi-spaced circumferential positions adjacent the periphery four equi-spaced posts 13A, 13B, 13C and 13D. These define a cage or socket within which one normally places the bowl of the blender. However, in the present invention, nested in this socket is the bottom adapter ring 14 of bowl assembly 10 to maintain the assembly at a proper upright position on the platform. The cage or socket shown is by way of example, for various household blenders on the market have different forms of sockets or cages to accommodate the blender bowl.

As shown schematically in FIG. 4, housed within power base unit 11 is a motor 15 which is connected through a motor control circuit 16 to a cable 17 terminating in a plug 18 for insertion in an a-c power outlet (110 VAC). Motor control circuit 16 is operated by a knob 19 which, as shown in FIG. 1, has an "off" setting as well as low, medium and high speed "on" settings to vary the motor's rotary speed accordingly.

Motor 15 is provided with a shaft that extends upwardly through top platform 12 and terminates in a drive coupler DX which in the form shown is a square shaft section of the type found in the power base unit of a Waring type blender. However, in other commercial household blenders, the drive coupler of the unit takes other forms to complement the driven coupler on the bowl. Thus, the couplers may have a star or toothed formation.

Referring now to FIG. 3, it will be seen that bowl assembly 10 comprises a cylindrical inner cannister 20 and a cylindrical outer shell 21, both preferably fabricated of aluminum. These are shaped to define a double-walled jacket 22 having an internal cavity. The upper end portions of inner cannister 20 and outer shell 21 are joined together to form an upper rim section 23. The wall of cannister 20 in rim section 23 is formed to create an internal threading for screwing a screw-on lid 24, preferably of clear plastic. Lid 24 is provided with a central hub 25 having seated thereon a bearing 26 of Teflon (PTFE) or other low friction material suitable for bearings, such as nylon.

The lower end portions of inner cannister 20 and shell 21 are joined together to form the cylindrical bottom section 27 of the bowl assembly. The wall of shell 21 is shaped to define external threading to receive a screw-on bottom ring 28 which has a tapered cross section. Fitting onto ring 28 is the adapter ring 14 which effectively enlarges the diameter of ring 28 so that it can nest snugly within cage posts 13A to 13D on platform 12 of the power base unit.

With other commercially available power base units, different ring diameters may be required. Thus, in some instances one may dispense with adapter ring 14 and place bottom ring 28 directly within the cage of the unit, and in other instances it may be necessary to use an adapter ring 14 whose diameter is different from that shown.

Attached to outer shell 21 is a handle 29. Seated on top of jacket 22 is an annular gasket 30 which is engaged by lid 24 to prevent leakage of fluid when the appliance is in operation. A gasket 31 is also provided below the bottom section 27 of the assembly to prevent leakage in this region.

The re-entrant bottom wall 32 of the assembly which has a corrugated dome formation is adapted to support for rotation a short axle 33 which extends through the center of this wall. The lower end of axle 32 terminates in an external driven coupler DY having a square socket therein which is dimensioned, as shown in FIG. 4, to receive the square drive coupler DX of the unit when the bowl assembly is placed on platform 12 of the power base unit.

Driven coupler DY is also provided with opposing wings 34A and 34B which are adapted to fit within the teeth of a gear or star type drive coupler. Thus, driven coupler DY acts as a universal coupler for use in conjunction with various types of power base unit drive couplers.

The upper end of short axle 33 terminates in a shaft coupler 35 which is received within the complementary lower end socket 36 of the shaft 37 of a rotatable dasher 38. The upper end of dasher shaft 37 is received within bearing 26 on the removable lid 24. Thus, after the lid is removed from the bowl assembly, one can then remove dasher 38 for cleaning or replacement.

Dasher 38 is formed by a lower blade 38A secured to shaft 37 and a diametrically-opposed upper blade 38B, both blades being formed of flexible material and having large apertures therein. The edges 38' and 38" of blades 38A and 38B are in a serrated form and act to scrape off any ice build-up on the inner wall of cannister 20.

The internal cavity of the double walled jacket 22 is almost fully filled with a freezing agent 39 having a high heat capacity so that once frozen, it remains in this state for a prolonged period, even though it is in heat exchange relationship with a warmer, non-frozen body. This agent may be of the type disclosed in the Uesaka et al. patent 4,488,817 in which added to a water base are organic or inorganic salts such as glycol, ethyl glycol, polypropylene glycol, urea or NaCl. Or the freezing agent may be of the type disclosed in the Held et al. patent 4,357,809 in which use is made of a gel including cornstarch and borax. Or the gel may be of the type disclosed in the Spencer patent 3,885,403 formulated from water and a freezing point depressant, glycerine and propylene glycol with a thickening agent. The present invention encompasses any known freezing agent having a high heat capacity.

Operation of Appliance

Let us assume the appliance is to be used for a simple task; that is, to produce a chilled mixed drink whose components are various fruit juices and vodka or some other alcoholic beverage.

The bowl assembly 10 must be held in storage in a household freezer or in the freezer compartment of a household refrigerator for a period sufficient to thoroughly freeze the freezing agent. When the bowl assembly is to be put to use to produce the above-noted mixed drink, it is taken out of the freezer and placed on the platform of whatever power base unit is available in the household. Lid 24 is unscrewed from the assembly, and the various liquid ingredients are poured into cannister 20. Then the motor of the power base unit is turned on at the lowest speed to thoroughly intermingle the ingredients for a brief period, after which the motor is turned off to allow for heat transfer from the jacket having the frozen agent therein for a period sufficient to form a thin layer L of the frozen mixture on the inner surface of the cannister, as shown in FIG. 5.

The motor is then turned on again at low speed so that the serrated eges of blades 38A and 38B, which have sharp teeth, act to scrape the surface of frozen layer L to form fine ice chips C which, as indicated by the arrows, pass through the openings in the blades and are dispersed throughout the liquid mixture. Then the motor speed is increased to cause the mixture to froth, as a result of which air bubbles are intermingled therewith. This action is continued to permit further heat transfer between the liquid and the frozen jacket until the liquid mixture is very cold and ready to be served. At this point the motor is turned off, and the mixture is poured from the bowl assembly into glasses.

The same procedure can be used to make frozen daiquiries and similar alcoholic or non-alcoholic drinks such as milk shakes. The appliance is also usable in the making of ice cream, in which event fresh cream, flavoring and other ingredients are poured into the bowl and intermingled therein while being chilled to the desired consistency.

And instead of a dasher, use may be made of a rotating comminuting blade of the type used in a conventional blender, so that the appliance can be used in the same fashion as a conventional blender to grind up and mix ingredients, the difference being that the resultant mixture is chilled.

Because the dasher is removable from the bowl assembly, this makes it possible to withdraw the dasher after the ingredients are thoroughly mixed and before it has a consistency so viscous as to make removal difficult. Thus, in the case of ice cream and frozen yogurt, the dasher may be removed at an intermediate stage in the operation, then permitting heat transfer to continue until the product has the desired final consistency. Also, the fact that the dasher is removable makes it possible to separately clean this component as well as the bowl and lid therefor.

While there has been shown and described a preferred embodiment of a household appliance for making frozen food products, it will be appreciated that many changes and modifications may be made therein without, however, departing from the essential spirit thereof.

I claim:

1. An appliance for making frozen or chilled food and beverage products, motive power therefor being supplied by the existing electric power base unit of a standard household blender having a conventional removable bowl incapable of making said products, which unit includes a case having a platform and motor whose shaft extends upwardly through the platform and terminates in a drive coupler, the platform having a socket or cage thereon adapted to accommodate the removable bowl of the blender, said appliance comprising:

a removable bowl assembly to be used in place of said removable bowl and adapted to make said products, said assembly being formed by an inner cannister for containing ingredients and having a bottom section embraced by a ring adapted to be received in said socket, and a double-walled jacket surrounding the cannister above the bottom section, said bowl assembly being formed by said inner cannister and an outer shell so shaped as to define therewith said double-walled jacket and said bottom section, said jacket being sealed and having a cavity therein containing a freezable agent constituted by a gel having a high heat capacity which is sealed within the jacket, whereby when the bowl assembly is stored in a freezer, said sealed agent is frozen, and when said assembly is placed on the platform of the unit, the jacket then functions as a frozen body heat transfer relation with respect to the ingredients contained in the cannister;

B a short axle supported for rotation on a bottom wall of the bottom section, said axle extending through the wall into the cannister and terminating at its lower end in an external driven coupler which is engaged by the drive coupler when the bowl assembly is placed on the platform; and C means coupled to the upper end of the axle and rotated thereby to mix ingredients placed in the cannister, whereby the ingredients are mixed as they are being chilled by heat transfer from the frozen body.

2. An appliance as set forth in claim 1, wherein said cannister and shell are formed of metal.

3. An appliance as set forth in claim 1, wherein said means is formed by a dasher having a shaft whose lower end is coupled to said axle.

4. An appliance as set forth in claim 3, further including a lid for said assembly, said lid having a central bearing therein adapted to receive and support the upper end of the dasher shaft.

5. An appliance as set forth in claim 1, wherein said means is a comminuting blade.

* * * * *